United States Patent
Albano et al.

(10) Patent No.: US 6,331,814 B1
(45) Date of Patent: Dec. 18, 2001

(54) ADAPTER DEVICE FOR THE TRANSMISSION OF DIGITAL DATA OVER AN AC POWER LINE

(75) Inventors: Andre Albano, Saint Laurent du Var; Patrick Michel, La Gaude; Alain Benayoun, Cagnes-sur-Mer; Jean-Francois Le Pennec, Nice, all of (FR)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/718,186

(22) Filed: Nov. 21, 2000

(30) Foreign Application Priority Data

Nov. 25, 1999 (EP) .................................................. 99480126

(51) Int. Cl.⁷ .................................................. H04M 11/04

(52) U.S. Cl. ............................... 340/310.01; 340/310.06; 340/310.07

(58) Field of Search ..................... 340/310.01, 310.02, 340/310.03, 310.06, 310.07; 379/412, 413; 375/289, 141, 145, 257, 259; 307/18, 125, 295

(56) References Cited

U.S. PATENT DOCUMENTS

| | | | |
|---|---|---|---|
| 5,396,555 | * 3/1995 | Shibata et al. | 379/412 |
| 5,559,377 | * 9/1996 | Abraham | 340/310.07 |
| 5,598,455 | * 1/1997 | Bliven et al. | 379/27 |
| 5,818,127 | * 10/1998 | Abraham | 340/310.07 |
| 5,949,327 | * 9/1999 | Brown | 340/310.01 |
| 5,994,998 | * 11/1999 | Fisher et al. | 340/310.01 |
| 6,140,911 | * 10/2000 | Fisher et al. | 340/310.01 |
| 6,157,292 | * 12/2000 | Piercy et al. | 340/310.01 |
| 6,185,262 | * 2/2001 | Brandstetter | 375/289 |

* cited by examiner

Primary Examiner—Van T. Trieu
(74) Attorney, Agent, or Firm—Bracewell & Patterson

(57) ABSTRACT

An adapter device for transmitting data from a local data-handling unit to a remote data-handling unit via an AC power line includes processing facilities that receive digital data from the local data-handling unit and transform the digital data into ISDN data. The adapter device also includes a burst transceiver circuit (BTC) that converts the ISDN data into low-voltage pseudo-ternary signals on a U interface. A transformer of the adapter device transforms the low-voltage pseudo-ternary signals into high-voltage pseudo-ternary signals and transmits the high-voltage pseudo-ternary signals via the AC power line. Such an adapter device may also be used for receiving the data from the local data-handling unit at the remote data-handling unit.

12 Claims, 3 Drawing Sheets

ADAPTER DEVICE FOR THE TRANSMISSION OF DIGITAL DATA OVER AN AC POWER LINE

BACKGROUND OF THE INVENTION

1. Technical Field

The present invention relates in general to the transmission of data over existing media in a building without adding any other cabling. In particular, the present invention relates to an adapter device for the transmission of digital data over an AC power line.

2. Description of the Related Art

The interconnection of hosts and peripherals such as printers or displays is generally made by means of cables and sometimes by electromagnetic waves such as infrared radiations when the peripheral is in sight with respect to the host. But, it sometimes is not possible to install cables in a building or such an installation is very difficult and very expensive because there are thick walls to come through. Anyway, adding cabling to an existing system in order to connect new peripherals is always unsightly. Furthermore, connection using electromagnetic waves, such as infrared, is not possible when the two devices to be interconnected are separated by obstacles such as walls.

SUMMARY OF THE INVENTION

According to a first aspect, the invention relates to an adapter device for utilizing an AC power line to carry data from a local data-handling unit (such as a computer) to a remote data handling unit (such as a printer or another computer). The adapter device includes processing facilities that receive digital data from the local data-handling unit and transform the digital data into Intergrated Services Digital Network (ISDN) data. The adapter device also includes a burst transceiver circuit (BTC) that converts the ISDN data into low-voltage pseudo-ternary signals on a U interface. A transformer of the adapter device transforms the low-voltage pseudo-ternary signals into high-voltage pseudo-ternary signals and transmits the high-voltage pseudo-ternary signals via the AC power line.

According to a second aspect, the adapter device is utilized for receiving data from the local data-handling unit at the remote data-handling unit.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
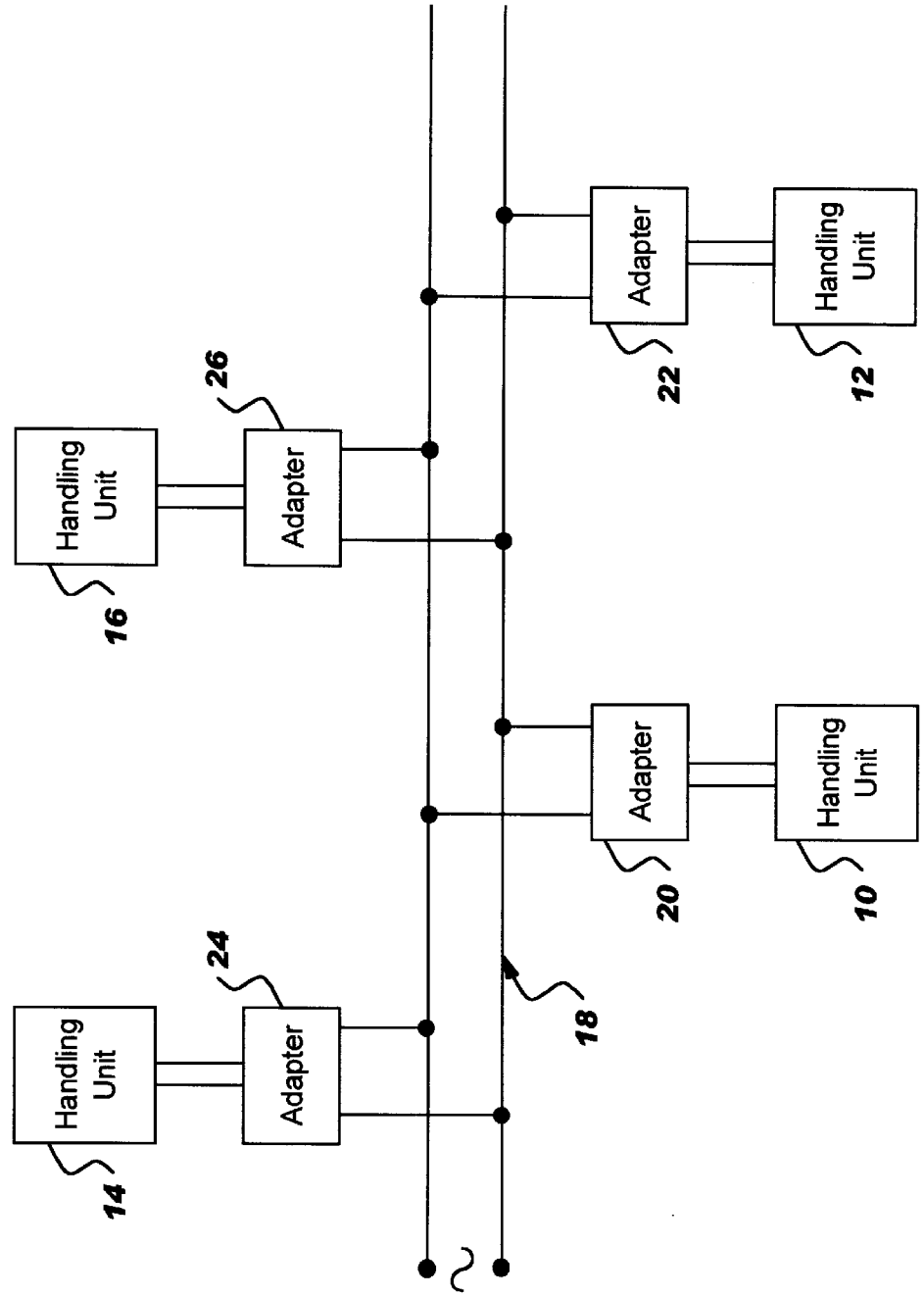
FIG. 1 is a block diagram of an exemplary data transmission system including a plurality of data-handling units connected together by AC power lines through adapter devices according to the invention.

According to a preferred embodiment of the invention illustrated in FIG. 1, a plurality of datahandling units 10, 12, 14 and 16 are connected to an AC power line 18 (e.g., the home power line at 230 volts) by means of adapter devices 20, 22, 24 and 26, respectively. The datahandling units may be hosts such as general purpose computers, peripherals such as printers or display units and generally any Data Terminal Equipment (DTE), or Data Communication Equipment (DCE), such as a modem connected to a data transmission network. Thanks to the adapter device associated therewith, any data-handling unit can transmit/receive data to/from any other data-handling unit bearing in mind that some data-handling units can only transmit data, other ones can only receive data and most of them can transmit and receive data. Thus, assuming that data-handling unit 10 is a computer, it can transmit/receive data to/from handling unit 12, 14, or 16 which may be located in another room far from computer 10 but in the same building. Note that, as described below, a data-handling unit may be composed of two units in parallel.

Figure 2:
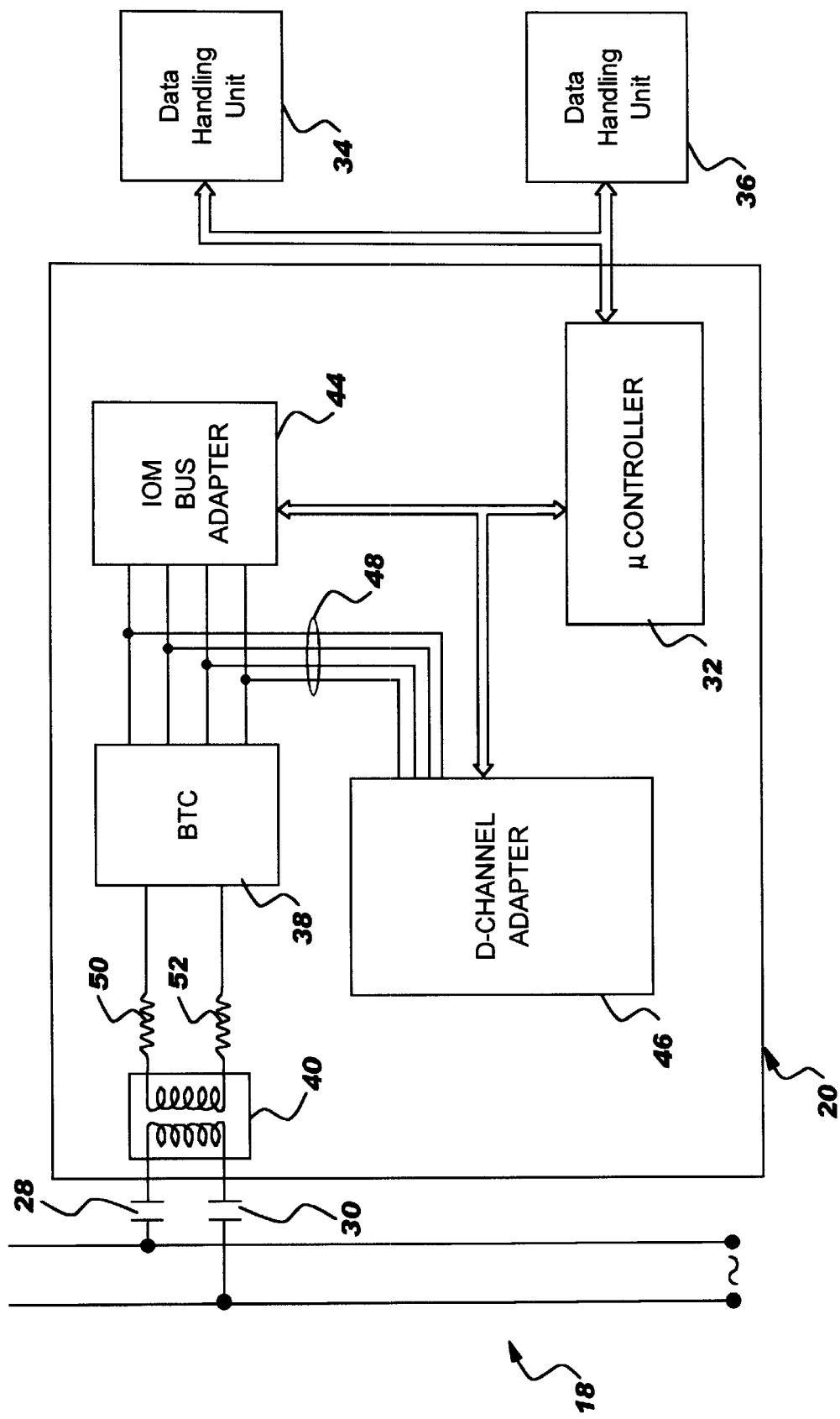
FIG. 2 represents a block-diagram of an exemplary adapter device according to the invention connected to an AC power line and to two data-handling units.

As illustrated in FIG. 2, adapter device 20 (or 22, 24, 26) is connected to AC power line 18 by a two-wire link, each wire being connected to each wire of the AC power line by capacitors 28 and 30 respectively, in order to block (or at least strongly attenuate) the low frequency signal at 50 Hz or 60 Hz of the AC power line.

Adapter device 20 includes a microcontroller 32 which is connected to one or two data-handling units such as units 34 and 36, a Burst Transceiver Circuit (BTC) connected to the AC power line by means of a transformer 40 and a filter, an ISDN Oriented Modular (IOM) bus adapter 44, and a D-channel adapter 46. IOM bus adapter 44 is connected to BTC 38 and to D-channel adapter 46 by means of an IOM bus 48.

First, adapter device 20 comprises a transformer 40 attached to the capacitor coupling (capacitors 28, 30) for adapting the impedance of the adapter device input to the AC power line (generally 120 ohms) and to transform the high voltage on the latter into the low voltage used by Adapter device 20. Transformer 40 is connected to BTC 38 by means of resistors 50 and 52 which are useful to adapt the impedance of the BTC input to the impedance of the filter output and reciprocally. Note that transformer 40 insures a safety barrier up to peaks of voltage as high as 4000 volts. It must also be noted that, in the receiving direction, a high-pass filter can be connected at the input of Adapter device 20 for removing the low frequency signal corresponding to 50 Hz or 60 Hz.

BTC 38 is an integrated circuit managing an International Consultative Committee on Telephony and Telegraphy (CCITT) two-wire U interface to the transformer and interfacing an IOM bus 48 on the other side. The signal at the U interface (filter side) is a pseudo-ternary mode signal running at 384 Kbits/s with echo cancellation and conveying a well-known ISDN signal composed of two B channels at 64 Kbits/s and a D-channel at 16 Kbits/s.

Figure 3:
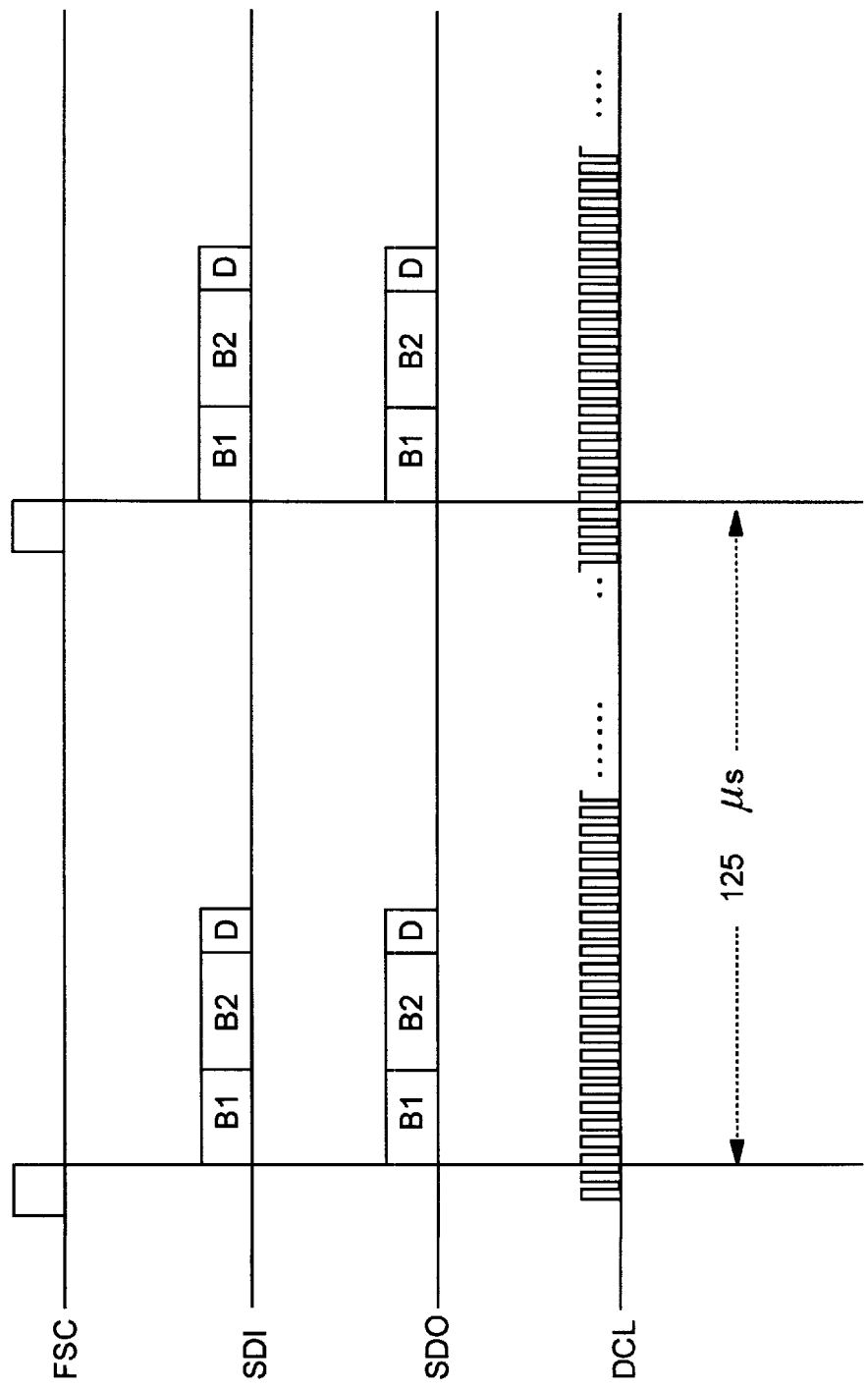
FIG. 3 depicts a timing diagram showing the channels and signals transmitted on the lines of the IOM bus used for conveying ISDN signals within the adapter device according to the illustrative embodiment of the invention.

On the other side of BTC 38, the IOM bus 48 provides a symmetrical four-wire full-duplex communication link containing data, control/programming and status channels. As illustrated in FIG. 3, the IOM bus is composed of a clock line (DCL) that operates at 384 KHz, a Frame Synchronization Clock (FSC) delimiting 8 Khz frames (each frame lasts 125 µs) and two lines for transmitting data, Serial Data Input (SDI) and Serial Data Output (SDO), each conveying two B1 and B2 channels at 64 Kbits/s and a D-channel at 16 Kbits/s. The remaining part of each frame is used for conveying synchronization bits or is not used. Note that the data will be sent on B1 channel (B2 channel is used as a backup) if only one data-handling unit 34 is attached to Adapter device 20, or on both B1 and B2 channels if two data-handling units 34 and 36 are attached to Adapter device 20.

Any transmission of data between data-handling unit 36 and 38 and another data-handling unit must be initialized by a negotiation managed by D-channel adapter 46 using the D channel of the ISDN signal. As such an adapter is well-known, in the ISDN environment, it will not be described further in this description.

The transmission of data from/to data-handling unit 34 or 36 is controlled by microcontroller 32, which interfaces both D-channel 46 for the negotiation and IOM bus adapter 44 for converting the parallel digital data into ISDN signals and reciprocally. For this, IOM bus adapter 44 includes a transmit FIFO and a receive FIFO. Microcontroller 32 includes a serial communication controller (SCC) for performing the encapsulation and the de-encapsulation in high-level data link control (HDLC) mode of all the data received/sent by IOM bus adapter 44.

Assuming that data-handling unit 34 (e.g., a host computer) has to transmit data to another data-handling unit connected to AC power line 18, microcontroller 32 has first to negotiate the connection. The address of the other data handling unit (which is HLDC encapsulated in the SCC of microcontroller 32) is sent to D-channel adapter 46 with a protocol of the type Link Access Protocol D-channel (LAPD). The address is stored in the internal transmit FIFO of the D-channel adapter 46 and a dial order is given by writing a command in a proper register. The address together with the protocol data are conveyed through IOM bus 48 to BTC 38 and converted by this one into a U standard pseudo-ternary code before being transmitted through the filter and transformer 40 over the AC power line. The LAPD negotiation being completed by D-channel adapter 46, the setting of one B-channel is achieved. It must be noted that an identical negotiation can be done for transmitting data over the other B-channel if two data-handling units are attached on Adapter device 20.

For the transmission of data, microcontroller 32 reads data from the data-handling unit and stores these data into its internal RAM. Then, the data are sent to IOM bus adapter 44 wherein they are converted into ISDN signals via the microcontroller data bus. The data which have been HDLC encapsulated in the SCC of microcontroller 32 are conveyed through the IOM bus 48 to BTC 38, wherein they are converted into U standard pseudo-ternary code for being transmitted on the AC power line through the filter and transformer 40.

Assuming now that another data-handling unit wants to transmit data to data-handling unit 34, the pseudo-ternary signal received from the AC power line through the adaptive coupling, transformer 40 and the filter, is incoming into BTC 38. The signal is converted from U protocol to IOM mode by BTC 38. Then, D-channel adapter 46 receives the address of the data-handling unit and generates an interruption to microcontroller 32 when the HDLC frame is ready in its internal FIFO. When the negotiation is achieved, data are sent through the B-channel which is decoded in the IOM bus adapter 44. When the internal receive FIFO of IOM bus adapter 44 is full, it generates an interrupt to microcontroller 32. The data are then dumped from IOM bus adapter 44 to the internal SCC of microcontroller 32 where they are de-encapsulated. Finally the data are transferred into the addressed data-handling unit 34 or 36.

While the invention has been particularly shown and described with reference to a preferred embodiment, it will be understood by those skilled in the art that various changes in form and detail may be made therein without departing from the spirit and scope of the invention.

What is claimed is:

1. An adapter device for transmitting data from a local data-handling unit to a remote data-handling unit via an AC power line, the adapter device comprising:
    processing facilities that receive digital data from a local data-handling unit and transform said digital data into Intergrated Services Digital Network (ISDN) data;
    a burst transceiver circuit (BTC) that converts said ISDN data into low-voltage pseudo-ternary signals on a U interface; and
    a transformer that transforms said low-voltage pseudo-ternary signals into high-voltage pseudo-ternary signals and transmits said high-voltage pseudo-ternary signals via an AC power line.

2. An adapter device according to claim 1, wherein:
    said ISDN data includes a D-channel; and
    said adapter device comprises a D-channel adapter that receives an address for a remote data-handling unit from said processing facilities and, in response, utilizes a link access protocol on said D-channel to negotiate a connection between said local data-handling unit and said remote data-handling unit over said AC power line.

3. An adapter device according to claim 1, wherein said processing facilities comprise:
    a microcontroller that manages receipt of said digital data from said local data-handling unit; and
    an ISDN oriented modular (IOM) bus adapter that converts said digital data into ISDN data in IOM mode.

4. An adapter device according to claim 1, comprising:
    one or more resistors interposed between said transformer and said BTC, such that, in conjunction with said transformer, said one or more resistors adapt an impedance of said adapter device to said power line.

5. An adapter device according to claim 1, comprising:
    one or more capacitors interposed between said transformer and said power line, such that said one or more capacitors attenuate signals from said power line below a predetermined frequency.

6. data transmission system comprising:
    an adapter device according to claim 1, wherein said adapter device comprises a first adapter device, said processing facilities comprise first processing facilities, said BTC comprises a first BTC, and said transformer comprises a first transformer;
    a local data-handling unit that utilizes said first adapter device to transmit information through said AC power line;
    a remote data-handling unit; and
    a second adapter device connecting said remote data-handling unit to said AC power line, said second adapter device comprising:
        a second transformer that receives said high-voltage pseudo-ternary signals from said AC power line and utilizes said high-voltage pseudo-ternary signals to substantially regenerate said low-voltage pseudo-ternary signals;

a second BTC that converts said substantially regenerated low-voltage pseudo-ternary signals into said ISDN data; and second processing facilities that transform said ISDN data into said digital data and transmit said digital data to said remote data-handling unit.

7. An adapter device for receiving data from a remote data-handling unit via an AC power line and forwarding said data to a local data-handling unit, the adapter device comprising:

a transformer that receives high-voltage pseudo-ternary signals from a remote data-handling unit via an AC power line and transforms said high-voltage pseudo-ternary signals into low-voltage pseudo-ternary signals on a U interface;

a burst transceiver circuit (BTC) that converts said low-voltage pseudo-ternary signals into ISDN data; and processing facilities that transform said ISDN data into digital data and transmit said digital data to a local data-handling unit.

8. An adapter device according to claim 7, wherein:

said ISDN data includes a D-channel; and said adapter device comprises a D-channel adapter that interprets a Link Access Protocol (LAPD) on said D-channel to determine that an address for said local data-handling unit has been received and, in response, interrupts said processing facilities to negotiate a connection between said local data-handling unit and said remote data-handling unit over said AC power line.

9. An adapter device according to claim 7, wherein said processing facilities comprise:

an ISDN oriented modular (IOM) bus adapter that receives said ISDN data from said BTC in IOM mode and converts said ISDN data into digital data; and a microcontroller that manages transmission of said digital data to said local data-handling unit.

10. An adapter device according to claim 7, comprising:

one or more resistors interposed between said transformer and said BTC, such that, in conjunction with said transformer, said one or more resistors adapt an impedance of said adapter device to said power line.

11. An adapter device according to claim 7, comprising:

one or more capacitors interposed between said transformer and said power line, such that said one or more capacitors attenuate signals from said AC power line below a predetermined frequency.

12. An adapter device for transmitting data from a local data-handling unit to a remote data-handling unit via an AC power line, the adapter device comprising:

processing means for transforming digital data into ISDN data;

conversion means for converting said ISDN data into low-voltage pseudo-ternary signals on a U interface; and transforming means for transforming said low-voltage pseudo-ternary signals into high-voltage pseudo-ternary signals and transmitting said high-voltage pseudo-ternary signals via an AC power line.

* * * * *